(12) United States Patent
Belenkii et al.

(10) Patent No.: US 9,217,643 B1
(45) Date of Patent: Dec. 22, 2015

(54) ANGLES ONLY NAVIGATION SYSTEM

(71) Applicants: Mikhail S. Belenkii, San Diego, CA (US); Timothy Brinkley, San Diego, CA (US)

(72) Inventors: Mikhail S. Belenkii, San Diego, CA (US); Timothy Brinkley, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

(21) Appl. No.: 14/121,918

(22) Filed: Nov. 3, 2014

(51) Int. Cl.
G01C 21/10 (2006.01)
G01C 21/02 (2006.01)
G01C 21/18 (2006.01)
G01S 19/40 (2010.01)
G01C 21/16 (2006.01)
G01S 19/47 (2010.01)
G01S 5/16 (2006.01)
B64G 1/36 (2006.01)
G01C 15/00 (2006.01)
B64G 1/24 (2006.01)
G05D 1/08 (2006.01)

(52) U.S. Cl.
CPC ............ *G01C 21/025* (2013.01); *G01C 21/165* (2013.01); *G01C 21/18* (2013.01); *G01S 19/40* (2013.01); *G01S 19/47* (2013.01); *B64G 1/24* (2013.01); *B64G 1/36* (2013.01); *G01C 15/00* (2013.01); *G01C 15/002* (2013.01); *G01C 21/10* (2013.01); *G01S 5/16* (2013.01); *G05D 1/0883* (2013.01)

(58) Field of Classification Search
CPC ......... G01S 5/16; G01S 19/40; G05D 1/0883; G01C 15/002; G01C 21/165; G01C 21/025; G01C 21/10; G01C 21/18; B64G 1/36; B64G 1/24
See application file for complete search history.

(56) References Cited

U.S. PATENT DOCUMENTS

| | | | | |
|---|---|---|---|---|
| 5,477,459 A | * | 12/1995 | Clegg | G01S 5/16 356/152.1 |
| 2008/0046138 A1 | * | 2/2008 | Fowell | G05D 1/0883 701/13 |
| 2009/0177398 A1 | * | 7/2009 | Belenkii | G01C 21/165 701/500 |

* cited by examiner

*Primary Examiner* — Behrang Badii
(74) *Attorney, Agent, or Firm* — John R. Ross

(57) ABSTRACT

An angles only navigation system. The system includes an IMU coupled with a passive optical sensor. The optical sensor provides periodic updates to the IMU in order to correct for accelerometer and gyro drifts. The IMU computes the air vehicle's instantaneous position, velocity, and attitude using gyro and accelerometer measurements. The optical sensor images stars and satellites. The navigation filter combines optical sensor measurements with IMU inputs, and determines those corrections needed to compensate for the IMU drifts. By applying periodic corrections to the IMU using satellite angular measurements, the navigation filter maintains an accurate position estimate during an entire flight.

16 Claims, 14 Drawing Sheets

ANGLES ONLY NAVIGATION SYSTEM

GOVERNMENT SUPPORTED RESEARCH

The present invention was made under contracts with the Office of Naval Research, conceived under Contract Number N00014-8-M-0183 and reduced to practice under Contract Number N00014-12-C-0052, and the United States Government has rights in the invention.

CROSS REFERENCE TO RELATED APPLICATIONS

This application is a continuation-in-part of patent application Ser. No. 12/319,651 filed Jan. 8, 2009.

FIELD OF INVENTION

The present invention relates to navigation systems and in particular to angles only aircraft navigation systems.

BACKGROUND OF THE INVENTION

GPS

The Global Positioning System (GPS) is a space-based satellite navigation system that provides location and time information in all weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver.

The GPS project was developed in 1973 to overcome the limitations of previous navigation systems, integrating ideas from several predecessors, including a number of classified engineering design studies from the 1960s. GPS was created and realized by the U.S. Department of Defense (DoD) and was originally run with 24 satellites. It became fully operational in 1995.

Future aircraft will operate for long durations (from tens of minutes to several hours) at supersonic speeds (Mach 3 to Mach 5) and altitudes of 70,000 feet above ground level. There exists a strong possibility that such vehicles will not be able to rely upon GPS for the entire flight path. In some situations GPS may not be available. It can be jammed or interfered with to provide false information.

IMUs

An Inertial Measurement Unit (IMU) can mitigate the effects of GPS denial. However, gyro errors (attitude), accelerometer errors (position and velocity), and the "cross product" of acceleration and attitude errors accumulate over time. Consequently, the IMU precision can drift outside mission required accuracy. A star tracker potentially can provide periodic updates to bound position and attitude errors in the IMU. However, a conventional star tracker on a moving platform has a limitation. It can determine precision attitude fix (pitch, roll and yaw) by imaging two, or more, bright starts separated by a large angular distance. It cannot however determine position fix with respect to terrestrial reference frame. The latter is because a local vertical reference is required to determine position fix from the star measurements. Since neither an accelerometer nor a tilt meter can discriminate between gravity force and acceleration, measurements of the local vertical on a moving platform are very difficult. This places a fundamental limitation on utility of conventional star trackers for High Mach High Altitude (HMHA) air vehicles and Unmanned Air Vehicles (UAV). The IMU is the main component of Inertial Navigation S stems (INSs).

INSs

At low terrain-following altitudes, a high quality Inertial Navigation System (INS) coupled with a radar altimeter, radar sensor, or Doppler navigation sensor is used by long-range cruise missiles and combat aircrafts. However, at high altitudes, active RF and optical sensors are susceptible to detection by enemy defense systems. This precludes the use of active RF and optical sensors. On the other hand, at high altitudes, optical imaging of the terrain features cannot be used for navigation due to cloud cover over long ranges. This suggests that a non-conventional approach must be developed for GPS denied navigation of high altitude air vehicles.

Inertial navigation systems play a major role in mitigating the effects of GPS denial. The IMU is initialized at a launcher. Then using a continuous, rapid series of gyro and accelerometer measurements, the IMU computes the air vehicle's instantaneous position, velocity, and attitude at any given later time. However, gyro error (attitude), accelerometer error (position and velocity), and the "cross product" of acceleration and attitude errors accumulate over time. Depending on the precision of the IMU, this "cross product" can accumulate at different rates. To provide accurate position estimates, periodic IMU updates from an external system are required in order to correct for position and attitude drifts, as well as "cross product" of acceleration and attitude error. A passive optical star tracker can potentially provide those periodic updates needed to correct the IMU navigation errors. Celestial-inertial navigation systems have been successfully used on a small number of aircrafts (SR-71, U-2, and B-2 and B-58 bombers).

Kalman Filters

The Kalman filter is an algorithm that uses a series of measurements from different sensors observed over time, containing noise (random variations) and other inaccuracies, and produces estimates of unknown variables that tend to be more precise than those based on a single measurement alone. More formally, the Kalman filter operates recursively on streams of noisy input data to produce a statistically optimal estimate of the underlying system state. A common application for the Kalman filter is for guidance, navigation and control of vehicles, particularly aircraft and spacecraft. The algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. Because of the algorithm's recursive nature, it can run in real time using only the present input measurements and the previously calculated state and its uncertainty matrix; no additional past information is required.

Applicants and their fellow workers have developed and field demonstrated an Automated Celestial Navigation System for navigation of surface ships. See U.S. Pat. No. 7,447, 591, issued Nov. 4, 2008. This invention utilizes a large infrared telescope to image stars even during daylight hours. This system however requires knowledge of the gravity vector which the Applicants obtained from an inclinometer. Under a follow-on contract funded by the National Geospatial Intelligence Agency (NGA), Applicant's employer built an Electronic Replacement for Geodetic Astrolabe for precision mapping of the Earth gravity field. This sensor determined the deflections of vertical of the gravity field with precision of 1 grad using star measurements. The sensor was also a precision navigator for terrestrial applications with position accuracy of 6 m. In both cases, a precision inclinometer, or tilt meter, was used to measure the local vertical. This measurement was used to convert the observer position in a celestial reference frame, determined from star angular measurements, into a geo-position in a terrestrial reference frame, longitude and latitude. However, on a moving platform, the inclinometer cannot discriminate a gravity field from acceleration, and thus cannot be used to measure local vertical.

What is needed is a new approach, independent of the local vertical, for measurements on a moving platform to provide periodic updates to correct navigation errors in the INS.

SUMMARY OF THE INVENTION

The present invention provides an angles-only navigation system.

Angles Only Navigation System

The concept of angles only navigation has been exploited in the areas of naval applications, orbit determination, and target tracking. Angles only navigation determines the position of the aircraft using angular measurements of satellites whose precise position in 3-D space is accurately known. Therefore this navigation method does not require use of the local vertical, or gravity vector, to determine position. The basic principal of this navigation is simple. By measuring line-of sight angles (i.e. azimuth and elevation angles) from the aircraft to the satellite, the relative position and velocity between the two objects can be estimated. If the position and velocity of the satellite is known (satellites ephemeris) then the position and velocity of the air vehicle can be determined. Since the earth orbiting satellites are located relatively near the aircraft, the position, orientation and velocity of the aircraft can be determined utilizing parallax concepts based of at least two line of sight satellite measurements. (In addition to aircraft, the same analysis can be applied with respect to land vehicles or ocean, lake or river vehicles.) In reality, several measurements of different satellites, or one satellite at different times, are required for accurate position determination. Imaging of LEO and GEO satellites has also been experimentally demonstrated in the past by Applicants. Preferred embodiments are utilized to provide position, orientation and velocity of aircraft. The system includes an INS coupled with a passive optical sensor. The optical sensor provides periodic updates to the INS in order to correct for accelerometer and gyro drifts. The IMU of the INS computes the air vehicle's instantaneous position, velocity, and attitude using gyro and accelerometer measurements. The optical sensor images stars and satellites. The navigation filter of the INS combines optical sensor measurements with IMU inputs, and determines those corrections needed to compensate for the IMU drifts. By applying periodic corrections to the IMU using satellite angular measurements, the navigation filter maintains an accurate position estimate during an entire flight.

In preferred embodiments the angles only navigation system includes a stabilized mount, an optical star and satellite tracker that includes a telescope and an infrared camera and is adapted to track earth orbiting satellites or stars and to record satellite images along with at least one reference star. These embodiments also include an IMU co-located with the star and satellite tracker and a computer processor adapted to compute satellite tracker data including at least two line of sight angles from the aircraft to at least one satellite with known three dimensional coordinates. These embodiments also include a Kalman filter adapted to optimally blend the star and satellite tracker data and the IMU measurements together to provide navigation information.

The line of sight angles may be azimuth and elevation angles and the stabalized mount may be a gimbled platform. In preferred embodiments the tracker maybe adapted to operate in a short wave infrared spectral range, such as between 1.4 micron and 1.7 micron or in a visible spectral range. In some embodiments the system is adapted to fit within a high-speed, high-altitude aircraft which may be maned or un-maned. The un-maned aircraft may be a guided missile. Or the navigation system may be installed on board a land-based vehicle or on board a water-based vehicle, such as a ship.

The navigation system may be adapted to track an earth orbiting satellite while imaging at least one star, or it may be adapted to track at least one star while imaging at least one earth orbiting satellite. The computer processor preferably is programmed to treat stars as providing an infinite paralax and earth orbiting satellites as providing a finite paralax.

DETAILED DESCRIPTION OF PREFERRED EMBODIMENTS

Figure 1:
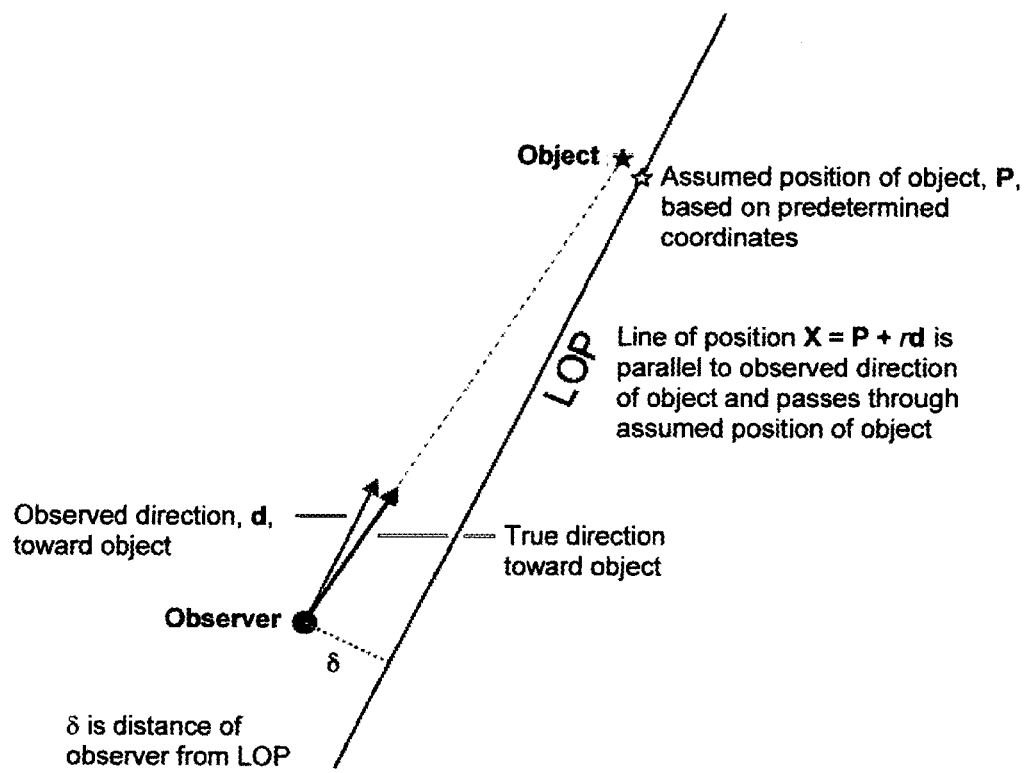
FIG. 1 shows the geometry of a single observation for an angles only navigation system.

To overcome the shortcomings referred to in the background section Applicants have developed a angles-only navigation system, which determines precision position fix of an air vehicle from line-of-sight measurements to earth orbiting satellites with known positions using an angles-only navigation method. Unlike conventional star trackers, the angles-only navigation system does not require a local vertical reference to be known. The system enables correction for all gyro and accelerometer drifts and errors without local vertical reference of acceleration and gyro errors, using line-of-sight measurements of bright stars and satellites.

The system includes:
a) a stabilized mount, or gimbaled platform;
b) a star and satellite tracker operating in the short wave infrared spectral waveband (such as the wavelength range between 1.4 micron and 1.7 micron); and
c) an inertial navigation system including:
  1) an IMU co-located with the star/satellite tracker, and
  2) a Kalman filter that optimally blends the star/satellite tracker data and the IMU measurements together.

In preferred embodiments a star tracker is mounted on a rigid, low-cost, two-gimbal stabilized platform. A strap down IMU is mounted at the bottom of this stabilized platform. A star and satellite tracker provides star and satellite data to a navigation Kalman filter which updates the vehicles position, velocity and attitude. The embodiments do not require a local vertical reference or input from the GPS. Since the tracker and the IMU are passive the system is jam-proof Embodiments of the present invention utilizes a special navigation Kalman filter, which integrates both position information from the star and satellite tracker with time and catalog information and IMU measurements to bound the position and attitude errors of the aircraft. The result is a complete and robust navigation solution for aircraft including piloted aircraft, drones and other UAVs. Using this technology, the aircraft can fly for an extended period of time without inputs from GPSs.

Simulations

Applicants have validated the angles only navigation methods in simulation using a Monte-Carlo-like schemes and a satellite tool kit. They have estimated the satellite observation probabilities and predicted observer position accuracy. The simulations confirmed that the angles only navigation method is feasible. In addition, they have designed and fabricated a breadboard of a star tracker and observed multiple LEO, GPS, and GEO satellites at sea level in San Diego, Calif. A total of 38 LEO satellites and 39 GEO and GPS satellites were observed using a small ground-based telescope.

The following assumptions were used:
Applicants can track LEO satellite with 1 arc-min open-loop precision;
Every 50 s, there is a star in the field of view that provides 15 grad precision;
Initial satellite position estimate from two line element set describing orbits of earth satellites file is precise to 5 m and 0.01 m/s in each dimension;
Initial position estimate of observer position is 500 m in each dimension (stationary).

Figure 8:
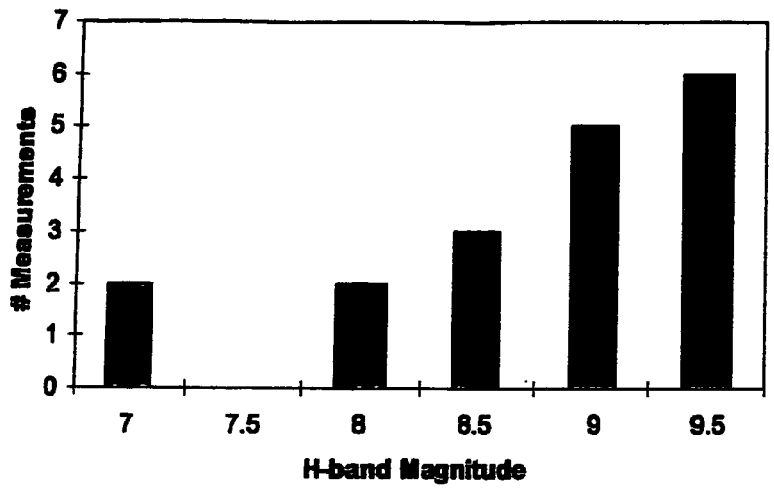
FIG. 8 is a histogram of H-band magnitude of several GEO satellites observed at sea level.
Figure 9:
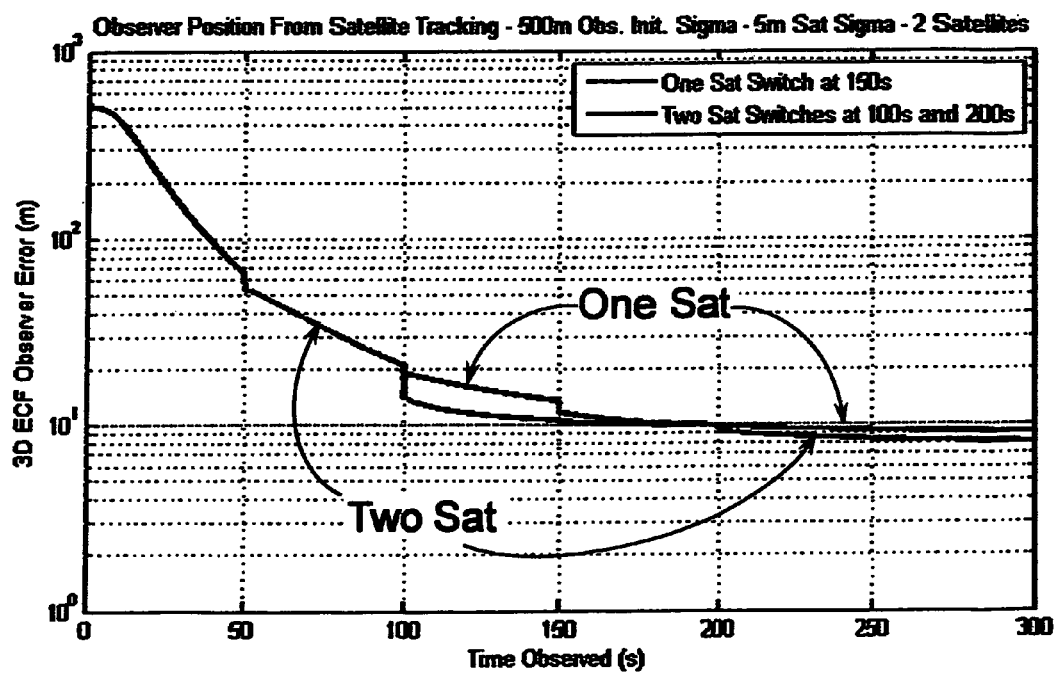
FIG. 9 shows observer location error as a function of observer time.

The simulation results for a single satellite are shown in FIG. 8. It is seen that after 200 sec, the RMS position error is close to 10 m. This simulation results suggest that Applicants preferred method is feasible. The reader should note that the first assumption is not critical, and most of the corrections are achieved at 50 second intervals, when the reference stars give the higher precision measurements.

Demonstration of Angles-Only Navigation Method

Theory

The present invention involves determining position, velocity and attitude information for a moving vehicle using apparent directions or motions of objects at finite distances. As opposed to the stars, earth orbiting satellites are at finite distances. They allow both observer position and velocity determination using only angular measurements of the satellites. The angles only method does not require any previous estimate of position or motion, and is of closed form, not stepwise or iterative. It is a least-square-based triangulation generalized to a moving vehicle, involving only angular observations of objects with known coordinates. It is "absolute" in the sense that it incorporates observations expressed in the same 3-D reference system as the vehicle's coordinates. The angular observations are taken at various positions along the observer's track. The observations are assumed to be uncorrelated and to have normally distributed random errors but not significant systematic errors. The solution minimizes the effects of errors in both the observations and in the assumed object coordinates in a least-squares sense. Thus, the angles-only approach is based on observations of the directions of identifiable objects with known coordinates, from the point of view of an observer whose own coordinates are to be determined.

Figure 2:
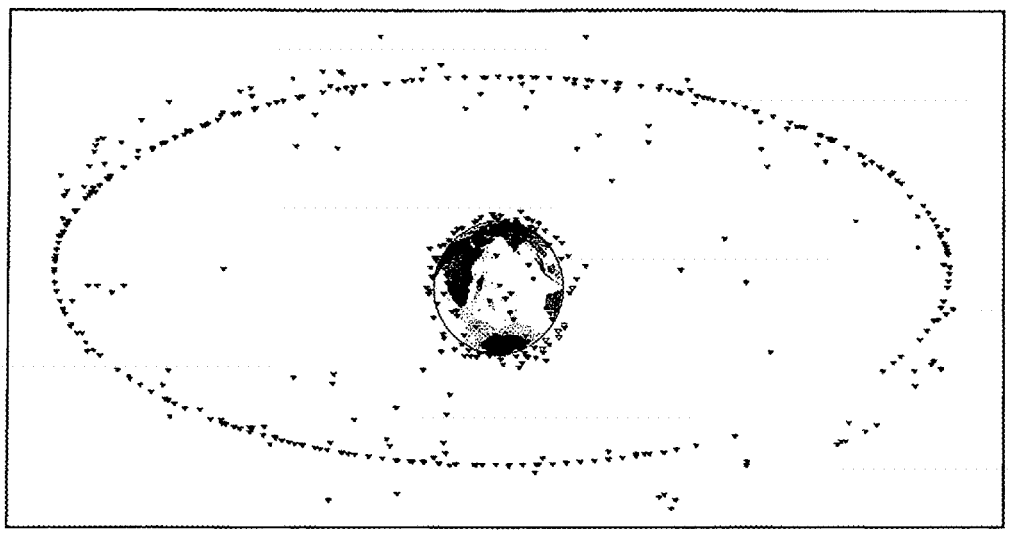
FIG. 2 is a map of GEO, GPS and LEO satellites.

For each object observed, two kinds of information are required: the predetermined coordinates of the object, represented by the position vector P; and the observation itself, represented by the direction (unit) vector d. In the absence of errors, the observer must be somewhere on a line of position (LOP) in 3-space given by the equation:

$$X=P+rd, \quad (1)$$

where X is the position of an arbitrary point along the line and r is a scalar that can take on any real value. The components of the vectors X and P and the scalar r have units of length, while d is dimensionless. Applicants assume that X, P, and d may be functions of time; for a moving target, the time series of vectors P(t) is referred to as its ephemeris. FIG. 1 shows the geometry of a single observation. Both the observed direction of the object and the object's coordinates are assumed to have some error. Because the AO navigation method is based on line-of-sight measurements to earth orbiting satellites, it is important to know how many satellites are orbiting the Earth and if they are observable. To deal with this issue Applicants have observed earth orbiting satellites using a small ground-based telescope. FIG. 2 depicts a map of Geostationary (GEO), GPS and Low Earth Orbit (LEO) satellites. There are 373 GEO satellites (outer ring at 40,000 km), 33 GPS satellites (intermediate distance, 20,000 km), 155 bright LEO satellites (near Earth's surface, 1000 km-6000 km) and 44 additional LEO navigation satellites (unknown precision). Table 1 presents a list of the 18 LEO satellites whose positions are known at the meter-or-better level.

Table 1.
(List of the 18 LEO satellites whose ephemerides are known at the meter-or-better level)
LAGEOS 1, GRACE 2, GRACE 1, JASON 2, JASON, ENVISAT, LAGEOS 2, STARLETTE, ICESAT, EGP (AJISAI), EXPLORER 27, STELLA, TERRA SAR X, ALOS, ERS 2, LARETS, CHAMP, GFO-1

Figure 17:
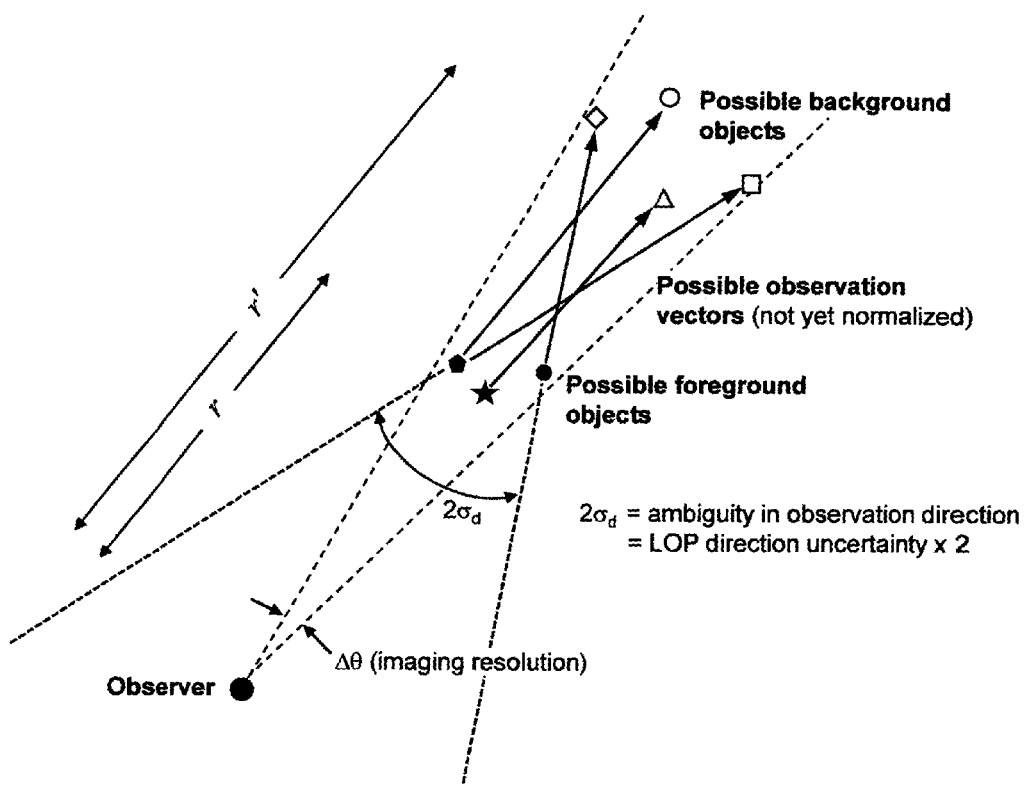
FIG. 17 shows possible locations of a potential line of position.

Prior to determining a solution, a rough idea of the position accuracy can be obtained by considering the geometry of the LOP. For this purpose, it is assumed that all observations are of similar quality and are well distributed in direction and time. In other words, that there is little or no geometric dilution of precision. As shown in FIG. 1, each LOP is defined by both its "anchor" in 3-D space, a point at the assumed coordinates of the object observed, and by its direction, defined by the observation itself. Since the LOP is given by equation (1) above, where r is a scalar of arbitrary value, the statistical uncertainties at a distance r from the object are related by $$\sigma_X^2=\sigma_P^2+r^2\sigma_d^2, \quad (2)$$

where each σ is the root-sum-square of the uncertainties in the respective vector components. Since d is always a unit vector, $\sigma_d$ represents an angular uncertainty in radians, which is taken to be the centroiding error of the imaging system. The first term on the right of equation (2) represents the average radius of an ellipsoid of uncertainty around the assumed position of the observed object due to likely errors in its coordinates. The r-term represents a cone of expanding uncertainty with its axis along d, its apex at the assumed position of the object (where r=0), and its apex angle equal to $2\sigma_d$. Therefore, the LOP could plausibly be any line originating within the ellipsoid of uncertainty with a direction parallel to any line within the cone of uncertainty, as shown in FIG. 17.

The observer is expected to be somewhere within, or not far outside of, each LOP's volume of uncertainty. Thus for observation i, $\delta_i \approx \sigma_x(r_i)$, which requires at least a crude estimate of $r_i$, the distance of the object from the observer. The $\delta^2$ should be approximately equal to the variance of the fit. Hence there is a simple way to anticipate the accuracy that can be obtained by various observing schemes.

A star tracker can observe GPS and GEO satellites at night. The probability of a direct view of a GPS or GEO satellite somewhere in the sky is continuously nearly 100%. During the daytime, especially just before sunset, a star tracker can observe sunlit LEO satellites.

Figure 3:
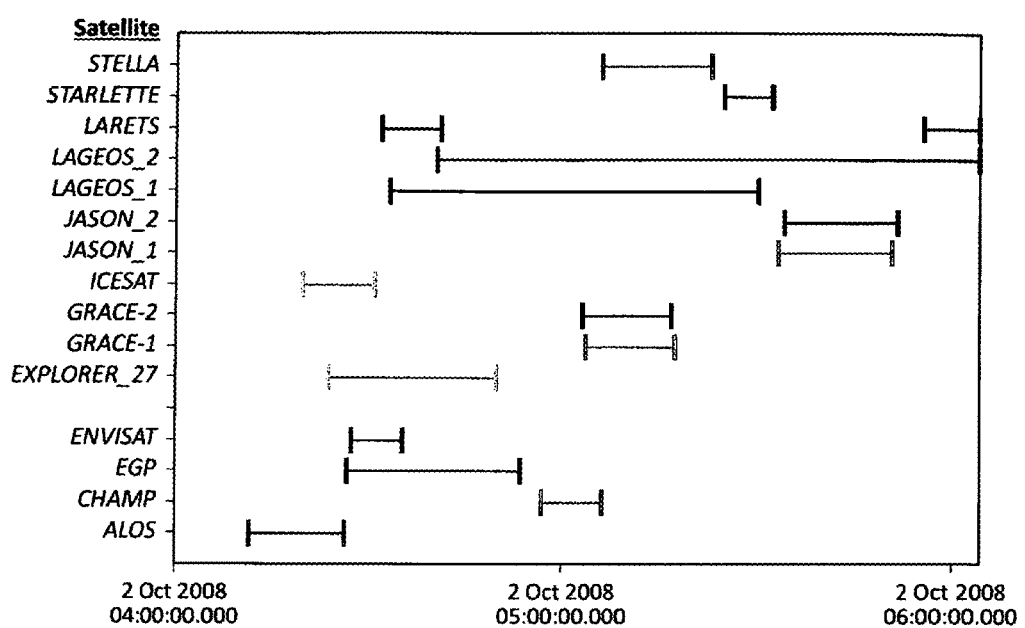
FIG. 3 shows LEO satellites visibility during a great-circle flight just over 2 hours between Washington and London at 3000 km/h at 70,000 ft.

FIG. 3 depicts LEO satellite visibility versus time for a great-circle 2-hour flight calculated using the Satellite Tool Kit (STK). In this example, no satellites were observed for 10% of the flight (at the beginning of the flight), one satellite was observed for 17%, and 2 or more satellites were observed for 72% of the flight. Note that the STK simulation is just one random sample out of all possible flight paths and dates/times.

In collaboration with the United States Naval Observatory (USNO), the performance of Applicant's preferred angles only navigation method was evaluated in simulation using a Monte-Carlo-like scheme and the Satellite Tool Kit. The key assumptions are a) satellite-image centroiding uncertainty is 1 arcsec (5 micro radians) and b) satellite ephemeris errors are 3 m. The program assumes that these values represent the standard deviations (1σ) of normal, zero-mean distributions of errors. For each computed observation, a random error from the appropriate distribution is added to each component of the observed satellite's 3-D ephemeris position, and to the true observation angle, in a random direction.

Several categories were simulated: LEO satellites only, GPS satellites only, and two GPS satellites combined with one LEO satellite. For each category, 25 solutions were simulated. The track of the vehicle for all runs was taken to be a great-circle starting at a 60° heading off the U.S. Atlantic coast (latitude +36°, longitude −70°), beginning at various times between 0400 and 0600 UTC on 2 Oct. 2008. The span of observations simulated here for each run was quite short, about 3 minutes, because the vehicle is assumed to be moving very fast (3600 km/h). During that time the vehicle travels almost 200 km.

The simulation revealed that when 3 LEO satellites are observed, the average position error is 17 m. In the case of 2 GPS and one LEO satellites, the average position error is 54 m. Finally, in the case of GPS satellites only, the average position error is 73 m. The above simulation results suggest that Angles-Only navigation method is feasible. However, in order to prove that the corresponding sensor-system can be implemented in hardware suitable for high mach, high altitude air vehicles, Applicants demonstrated that LEO, GPS, and GEO satellites can be observed using a small ground-based telescope. To answer this question, Applicants developed a breadboard and performed a field demonstration in San Diego, Calif.

Validating Model

Applicants refer to a special preferred embodiment of the present invention as "Optical GPS. Applicants have performed tests to verify an approximate analytic expression for the radiometric SNR, which will be used to guide a design for and a performance analysis of the OP-GPS system. The analysis uses radiometric measurements of the sky background and satellite brightness.

System performance is characterized in terms of the radiometric SNR for object detection. The radiometric SNR is given by:

$$SNR = \frac{N_s}{\sqrt{N_s + n_p(N_b + N_d + \sigma_r^2)}}$$

where SNR is the single frame signal to noise ratio, $N_s$ is the number of signal photons detected, $n_p$ is the area of the object in pixels ($n_p$=4 in all cases here), $N_b$ is the number of sky background photons detected per pixel per frame, $N_d$ is the number of detector dark current electrons per pixel per frame, and $\square_r$ is the RMS read noise per pixel in electrons.

Figure 18:
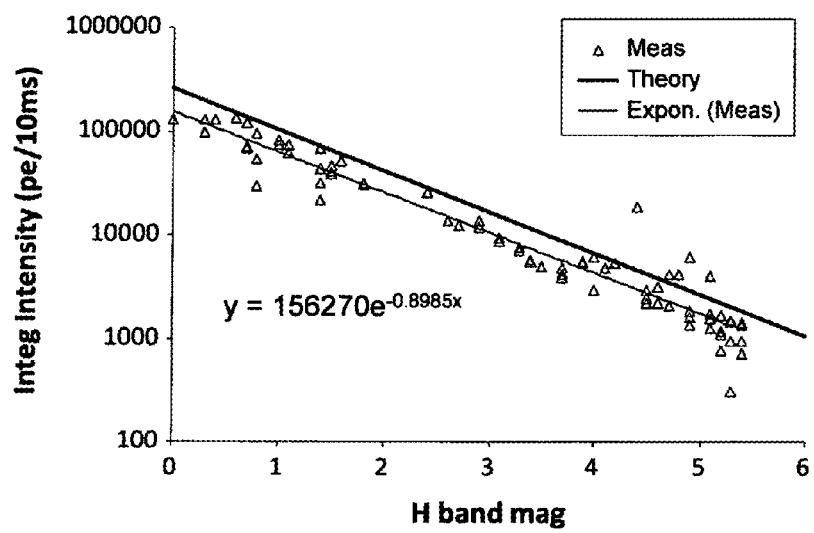
FIG. 18 shows integrated intensity as a function of H-band magnitude.
Figure 19:
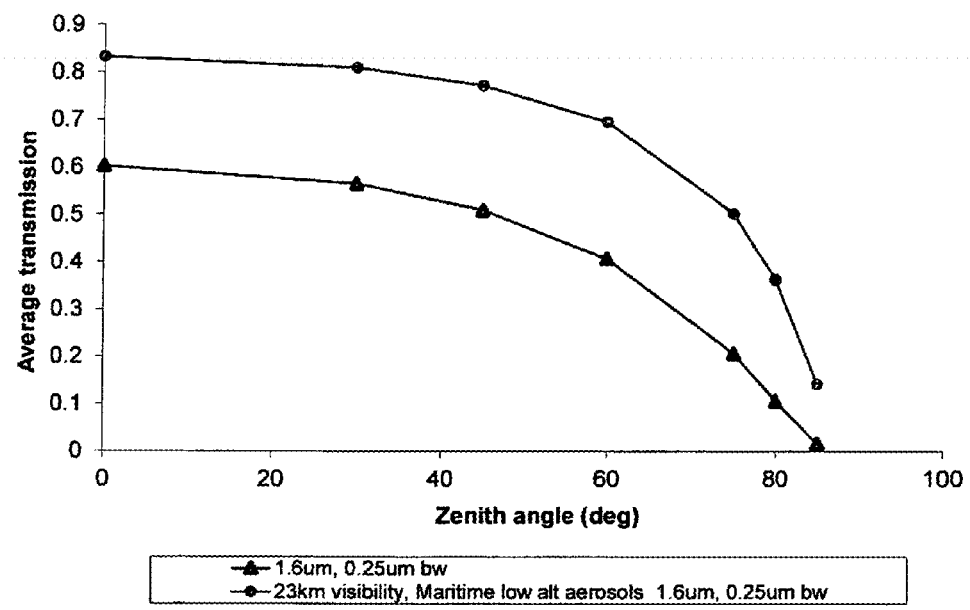
FIG. 19 shows transmission vs zenith angle.

Table 2 below presents the system parameters for data collection in San Diego. The theoretical signal-to-noise ratio for the current design is shown in FIG. 18, along with the measured signal levels for several stars compared with their catalog H-band magnitudes. All results are presented in terms of standard astronomical H-band, which corresponds approximately to the 1400 nm to 1700 nm pass band of the system. The least-squares fit to the field data predicts an intensity which is a factor of 1.7 times smaller than the theoretical curve. This is not surprising since there has been no attempt to correct for changes in atmospheric transmission over the course of the measurement. Intensity may be expected to change by more than a factor of two over the range of zenith angles (measurements ranged from 10° to 75°) and changing atmospheric conditions (FIG. 19).

TABLE 2

System parameters for data collection in San Diego

| Parameter | Units | value |
|---|---|---|
| Aperture diameter | cm | 20 |
| Exposure time | ms | 10 |
| Center wavelength | μm | 1.6 |
| Spectral bandwidth | FWHM | 0.25 |
| Camera read noise | pe rms/pixel | 125 |
| Atmospheric transmission | N/A | 0.5 |
| Optics transmission | N/A | 0.8 |
| Camera QE | N/A | 0.8 |
| Pixel size | μm | 31.5 |
| Diff limit spot size | μr | 8 |
| Object magnitude | H-band mag | 2 |
| Sky background | μw/cm²/sr/μm | 50 |
| Signal | pe/frame | 4.23E+04 |
| Background | pe/pixel/frame | 2.25E+05 |
| SNR | N/A | 42.2 |

Figure 20:
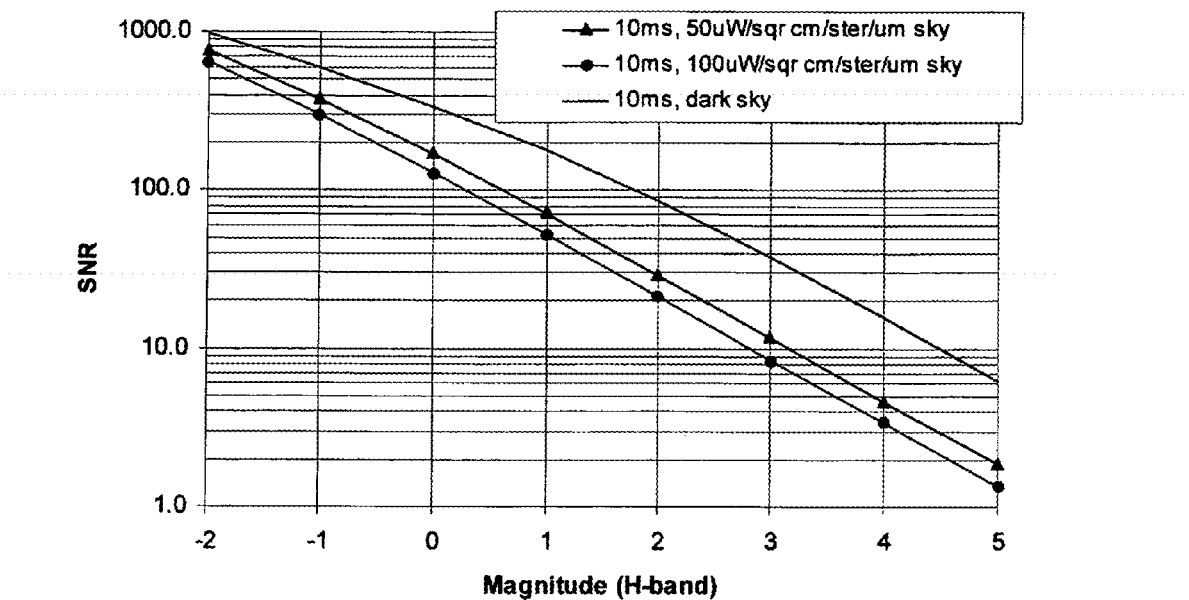
FIG. 20 compares SNR to object brightness.
Figure 21:
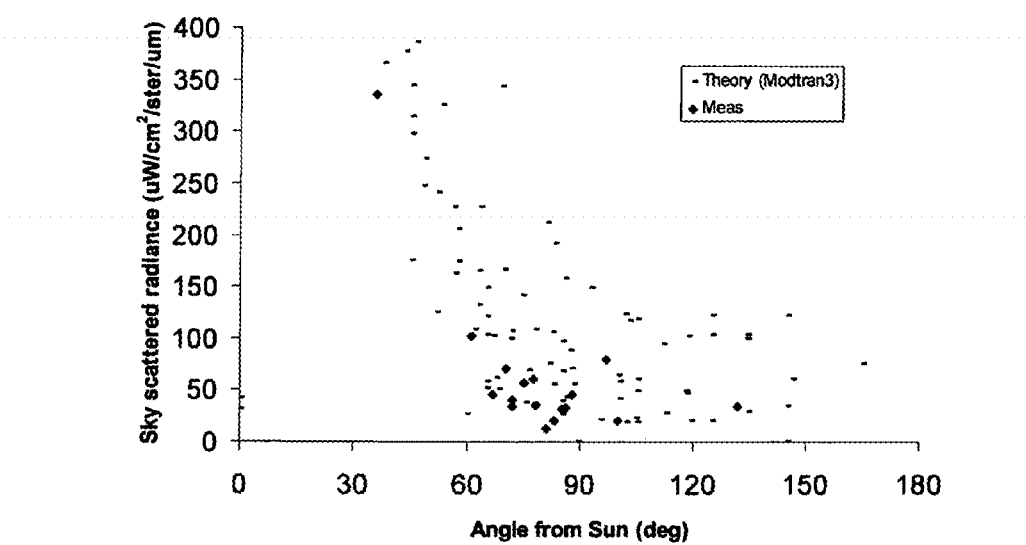
FIG. 21 compares sky brightness to theoretical values.

After slightly modifying the system parameter values, see Table 3, the theoretical SNR as a function of object brightness is shown in FIG. 20 for three sky background conditions. The measured sky brightness is shown in FIG. 21 in comparison with theoretical calculations. The large scatter for fixed angular offsets from the sun is the result of dependence of the sky brightness on solar zenith angle and observer zenith angle, which are ignored in this simplified view. Note that in any case the sky brightness is less than approximately 100 µW/cm²/sr/µm for observation directions more than 70 degrees from the sun. This implies that the single frame star limiting magnitude (SNR ~10) may be expected to be 2.8 or dimmer. Frame averaging or other additional processing can reduce the limiting magnitude further.

TABLE 3

System parameters modified to more closely match measurements in FIG. 20. The average measurement value and theoretical values now differ by less than 3%.

| Parameter | Units | value |
| --- | --- | --- |
| Aperture diameter | cm | 20 |
| Exposure time | ms | 10 |
| Center wavelength | µm | 1.6 |
| Spectral bandwidth | FWHM | 0.25 |
| Camera read noise | pe rms/pixel | 125 |
| Atmospheric transmission | N/A | 0.4 |
| Optics transmission | N/A | 0.8 |
| Camera QE | N/A | 0.6 |
| Pixel size | µr | 31.5 |
| Diff limit spot size | µr | 8 |
| Object magnitude | H-band mag | 2 |
| Sky background | µw/cm^2/sr/µm | 50 |
| Signal | pe/frame | 2.54E+04 |
| Background | pe/pixel/frame | 1.69E+05 |
| SNR | N/A | 29.1 |

Analytical Models

An approximate analytical model for radiometric SNR calculations used for predicting performance of the OP-GPS system has been validated using sky background and satellite brightness data. Applicants found that the theoretical values for the sky brightness calculated using the MODTRAN3 model are in agreement with the measurement data collected at sea level in San Diego, Calif. The sky brightness is less than approximately 100 µW/cm²/sr/µm for observation directions more than 70 degrees from the sun. This implies that the single frame star limiting magnitude (SNR ~10) is expected to be 2.8 or dimmer. The analytical model for radiometric SNR calculations will be used to guide a system design and performance analysis to validate a feasibility of the proposed OP-GPS system.

An analysis of LEO and GEO satellite statistics and brightness has been performed using field data obtained by Applicants. The average H-band magnitude of LEO satellites is 0.6 with a standard deviation of 1.9. The average H-band magnitude for GEO satellites was 8.5 with a standard deviation of 0.8. All the GEO satellites were recorded in a single night, with a magnitude of 9.5 being the limit of detection. This satellite data will be used as input parameters to the total OP-GPS system model to validate feasibility.

An analytical model for performance analysis of the proposed Optical GPS (OP-GPS) system including radiometric SNR calculations was validated using the sky background and satellite brightness data. Applicants found that the theoretical values for the sky brightness calculated using the MODTRAN3 model are in agreement with, the measurement data collected at sea level at San Diego, Calif. The sky brightness is less than approximately 100 µW/cm²/sr/µm for observation directions more than 70 degrees from the sun. This implies that the single frame star limiting magnitude (SNR ~10) is expected to be 2.8 or dimmer.

Brightness measurements for LEO and GEO satellites taken at Trex were analyzed. The number of stars detected in each satellite track was also determined. For LEO satellites, 4 of the potential 14 high precision LEO satellites were detected during daytime at sea level in San Diego, and an additional 3 of the 14 were detected at night. Regarding the limits of detection, H-band magnitude-1 satellites were observed during the daytime and H-band magnitude-3 satellites were observed at night. For GEO satellites, 24 of 35 potential GEO satellites were detected at night. The average H-band magnitude was 8.5 with a standard deviation of 0.8. Note that all the GEO satellites were recorded in a single night, with a magnitude of 9.5 being the limit of detection.

Satellite Statistics and Brightness

Figure 10:
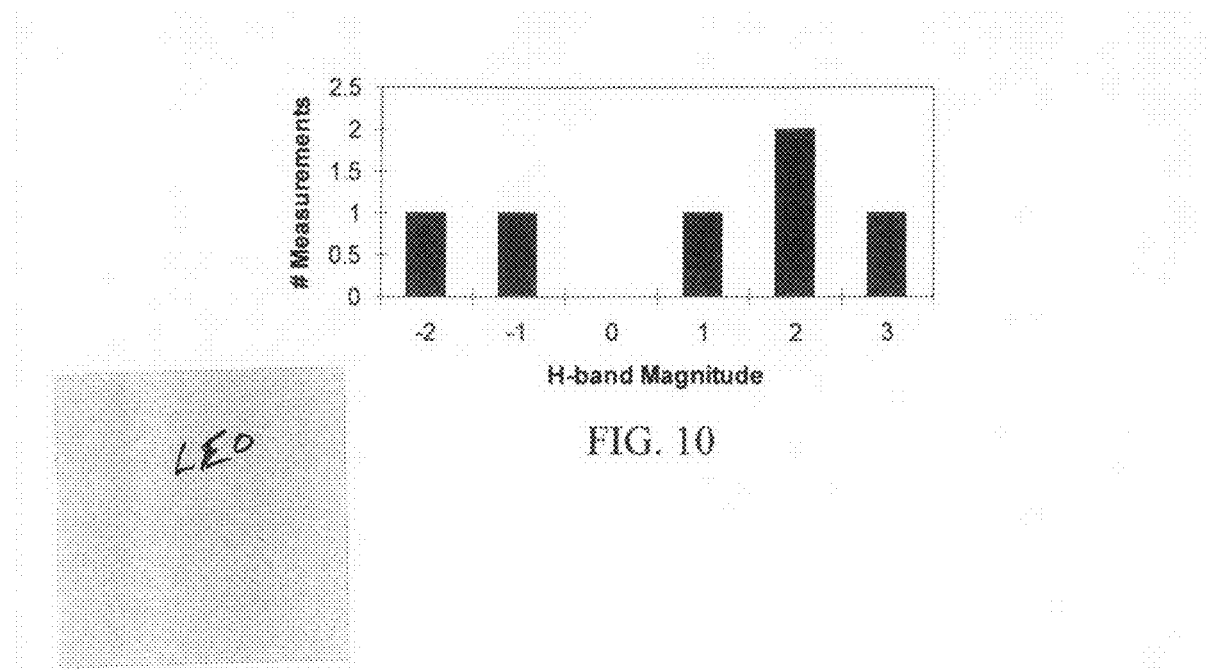
FIG. 10 is a histogram of H-band magnitude of several LEO satellites.

All collected data in which satellites were observed passing through the field of view was processed to determine the satellite brightness. In order to reduce the impact of changes in atmospheric transmission on the satellite magnitude measurements, stars within the same field of view are used as calibration references. The radiometry analysis procedure is semi-automated, and follows these steps:

1. Identify satellite images with stars in field sidereal track
2. Subtract background (sky)
3. Matched filter star detection
4. Threshold and integrated intensity of stars (automated)
5. Threshold and integrated intensity of satellite (manual)
6. Star identification
7. Scale satellite integrated intensity to H-band magnitude using USNO H-band catalog star intensity The satellite H-band magnitude is related to the star magnitude and measured intensities through $$m_{sat} = m_{star} - \frac{\ln(I_{sat}/I_{star})}{\ln(2.512)}, \quad (3)$$

where $m_{sat}$ is the satellite H-band magnitude, $m_{star}$ is the star H-band magnitude (from a catalog), $I_{sat}$ is the satellite measured intensity (in counts), and $I_{star}$ is the star measured intensity (in counts). A histogram of the H-band magnitude for all measurements where a LEO satellite was detected (over the course of 6 days of data collection) is shown in FIG. 10. Note that some satellites passes were recorded on multiple dates, and therefore multiple measurements per object are included. The average magnitude is 0.6 with a standard deviation of 1.9. Table 5 presents a summary of the LEO satellites detected during segments of 6 days of data collection. It indicates that 4 of the potential 14 LEO satellites were detected at daytime, and 3 of the 14 were detected at night. As far as the limits of detection, magnitude 1 satellites were observed during the daytime and magnitude 3 satellites were observed at night.

TABLE 4

LEO satellites detected in San Diego during segments of 6 days of data collection

| Nighttime Data: | |
| --- | --- |
| Stars detected (in processed imagery) | 55 |
| Unique satellites detected | 3 |
| Total number of satellite detections* | 7 |
| 1 star detected in satellite data set | 2 |
| 2 stars detected in satellite data set | 1 |
| 3+ stars detected in satellite data set | 4 |
| Daytime Data: | |

TABLE 4-continued

LEO satellites detected in San Diego during segments of 6 days of data collection

| | |
|---|---|
| Stars detected (in processed imagery) | 6 |
| Unique satellites detected | 4 |
| Total number of satellite detections* | 5 |
| 1 star detected in satellite data set | 4 |
| 2 stars detected in satellite data set | 1 |
| 3+ stars detected in satellite data set | 0 |

*Some satellites were detected on multiple dates.

FIG. 8 presents a histogram of the H-band magnitude for the 24 of 35 potential GEO satellites detected at night. The average magnitude is 8.5 with a standard deviation of 0.8. Note that all the GEO satellites were recorded in a single night, with a magnitude of 9.5 being the limit of detection. For a summary of GEO satellite measurements, see Table 4. One Block-IIA GPS satellite of magnitude 8.5 was also detected on this same night of data collection.

TABLE 5

Summary of GEO satellites detected during one evening of data collection in San Diego Nighttime Data:

| | |
|---|---|
| Stars detected (in processed imagery) | 44 |
| Unique satellites detected | 24 |
| 1 star detected in satellite data set | 16 |
| 2 stars detected in satellite data set | 2 |
| 3+ stars detected in satellite data set | 6 |

*No daytime data collected.

Conclusion is That Satellite Images Can Be Used to Navigate

In summary, from the above results it is clear that many satellites with precision orbits are visible with a 20 cm aperture telescope from sea level. Also, from the LEO satellite data, the measured sky scatter is less than approximately 100 $\mu W/cm^2/sr/\mu m$ (H-band) for observation directions more than 70 degrees from the sun. Lastly, for all types of satellites, multiple stars were detected along with the satellite in the observed sidereal track. This indicates that precise location determination of the satellite can be made using detected stars as the references.

Breadboard Design and Fabrication and Field Demonstration

A breadboard star tracker was developed using a 20 cm telescope and a SWIR InGaAs camera. Measurements of LEO, GEO, and GPS satellites were performed. The telescope was set up at a temporary location San Diego County providing clear skies and relatively dry conditions. This location offered unobstructed south and east horizons and convenient day and night operation. The setup used a fiber optic and an Ethernet cable to transmit data to the desktop computer located indoors about 20 feet from the telescope.

A planning list of all the LEO satellite passes, edited to show the data files that were actually saved, is presented in Table 6. The solar angle is the angle between the directions to the sun and to the satellite. The phase angle is the angle between the direction from the satellite to the observer and to the sun (the sum of the solar angle and phase angle is 180°). The range is in kilometers and sun elevation is in degrees. In the cases where the sun is below the horizon, the solar angle is not important; the value was replaced with "dark". Most of the passes were during the day, when there are many more opportunities to capture images. Over the course of 6 separate days of data collection, a total of 38 LEO satellite passes were recorded, including most of the satellites on the precision-orbit list.

Once the LEO satellite measurements were complete, the imaging system was set up for additional measurements of GPS and GEO satellites. These satellites move much slower than LEO satellites, and hence are easier to track over a limited telescope field of regard. The site used is partially blocked by security walls and a building, but the available field is large enough so that satellites were frequently visible.

Once the data was processed, Applicants were able to identify stars within the FOV and perform radiometry analysis, which will be discussed in detail in the following section. From matched filter star detection, Applicants identified 10 stars within the FOV, the brightest of the identified stars is 1.7 H-band magnitude. These stars acted as calibration references for the radiometry analysis, which yielded in one example an H-band magnitude of −1.3 for the EGP satellite listed in Table 6. In another example Applicants measured the satellite brightness to be 5.5 H-band magnitude. Finally, GPS BIIA-11 (by reference to a star with an H-band magnitude of 4.3) was measured at 8.5 H-band satellite magnitude.

TABLE 6

(List of LEO satellite acquisitions during data collection in San Diego, California)

| Satellite | Date | Result | time | solar deg | range | Phase angle | % illuminated | Sun Elevation |
|---|---|---|---|---|---|---|---|---|
| Starlette | Septemeber 18 | | 19:06:48 | dark | 1083 | 94 | 47 | −4 |
| JASON | Septemeber 18 | bright | 19:24:42 | dark | 1804 | 38 | 90 | −8 |
| EGP | Septemeber 18 | bright | 20:56:32 | dark | 1732 | 71 | 67 | −27 |
| JASON 2 | Septemeber 23 | | 19:20:42 | dark | 1564 | 100 | 42 | −9 |
| LAGEOS | Septemeber 23 | | 19:36:57 | dark | 8382 | 58 | 77 | −12 |
| EGP | Septemeber 23 | bright | 20:31:34 | dark | 1611 | 87 | 53 | −23 |
| TERRA | October 8 | bright | 17:49:11 | 139 | 1296 | 42 | 88 | 6 |
| LARETS | October 9 | | 9:48:47 | 72 | 752 | 108 | 34 | 34 |
| ALOS | October 9 | | 10:48:34 | 33 | 1435 | 147 | 8 | 43 |
| ENVISAT | October 9 | bright | 11:02:24 | 86 | 1237 | 94 | 46 | 45 |
| STARLETTE | October 9 | | 11:16:51 | 73 | 1299 | 107 | 36 | 46 |
| EGP | October 9 | | 14:14:09 | 78 | 2245 | 102 | 40 | 44 |
| STELLA | October 9 | | 14:53:07 | 39 | 856 | 122 | 24 | 39 |
| EGP | October 9 | | 16:15:00 | 77 | 1640 | 103 | 39 | 25 |
| ICESAT | October 13 | | 10:04:01 | 61 | 745 | 120 | 25 | 36 |
| ERS 2 | October 13 | bright | 11:07:16 | 69 | 1310 | 111 | 33 | 44 |
| ALOS | October 13 | | 11:51:03 | 76 | 823 | 105 | 37 | 48 |
| JASON | October 13 | | 13:25:03 | 89 | 2948 | 91 | 49 | 47 |
| JASON 2 | October 13 | | 13:25:59 | 89 | 2947 | 91 | 49 | 47 |

TABLE 6-continued (List of LEO satellite acquisitions during data collection in San Diego, California)

| Satellite | Date | Result | time | solar deg | range | Phase angle | % illuminated | Sun Elevation |
|---|---|---|---|---|---|---|---|---|
| EGP | October 13 | | 14:41:14 | 81 | 1676 | 99 | 42 | 39 |
| TERRA | October 13 | | 17:58:56 | 145 | 905 | 36 | 91 | 3 |
| EXPLORER 27 | October 13 | | 18:15:24 | 103 | 1803 | 77 | 61 | 0 |
| LAGEOS 1 | October 13 | | 20:18:28 | dark | 5971 | 56 | 78 | −26 |
| EXPLORER 27 | October 13 | | 20:10:26 | dark | 1338 | 68 | 69 | −24 |
| ALOS | October 14 | | 10:54:34 | 39 | 1277 | 142 | 11 | 42 |
| CHAMP | October 14 | | 13:57:38 | 99 | 1042 | 81 | 58 | 44 |
| EGP | October 14 | | 15:50:18 | 104 | 2249 | 75 | 63 | 28 |
| EXPLORER 27 | October 14 | | 17:32:50 | 113 | 2060 | 67 | 70 | 8 |
| TERRA | October 14 | | 17:41:45 | 153 | 1265 | 27 | 95 | 6 |
| EXPLORER 27 | October 14 | dim | 19:27:05 | dark | 1370 | 58 | 77 | −16 |
| EGP | October 14 | bright | 19:56:19 | dark | 2168 | 57 | 77 | −22 |

Radiometry Analysis

Radiometric analysis of the field data was performed by Applicants. Of the 18 LEO satellites whose precise ephemerides are known at the meter-or-better level, there were 14 potentially observable ones over the course of data collection. The average H-band magnitude was calculated to be 0.6 with a standard deviation of 1.9. A summary of the LEO satellites detected during segments of 6 days of data collection indicates that 4 of the potential 14 LEO satellites were detected at daytime, and 3 of the 14 were detected at night. As far as the limits of detection, we observed H-band magnitude 1 satellites during the daytime and magnitude 3 satellites at night.

For H-band magnitude, 24 of 35 potential GEO satellites were detected at night. The average magnitude is 8.5 with a standard deviation of 0.8. Note that all the GEO satellites were recorded in a single night, with a magnitude of 9.5 being the limit of detection. One Block IIA GPS satellite of magnitude 8.5 was also detected on this same night of data collection.

From the above summarized results, it is clear that many satellites with precision orbits are visible with a 20 cm aperture telescope from sea level. Also, from analysis of the LEO satellite data, the measured sky scatter is less than approximately 100 μW/cm²/ster/μm (H-band) for observation directions more than 70 degrees from the sun. Lastly, for all types of satellites, multiple stars were detected in the field with the satellite in sidereal track. This indicates that precise line-of-sight determination can be made using celestial references.

Sky Background at 70,000 ft

The sky brightness (radiance plus scatter) has been calculated using MODTRAN3 for fairly benign aerosol models (23 km rural visibility at ground level and sky background stratospheric). The results illustrate that the sky is approximately 100 times dimmer at 70,000 feet than at sea level in the near infrared (~1.5 μm). The dominant noise sources (i.e. photoelectrons (pe) per pixel of a SWIR star tracker, sky background and detector noise, are compared in Table 7 below. The results in Table 7 suggest that daytime sky background at 70,000 feet is a small fraction of detector noise.

TABLE 7

Comparison of the dominant noise sources for SWIR Star Tracker.

| | Sea Level | 70,000 ft |
|---|---|---|
| Sky background (pe/pixel, mean) | 460000 | 4600 |
| Sky background noise (pe/pixel, rms) | 678 | 68 |
| Detector noise (pe/pixel, rms) | 300 | 300 |
| Total noise (pe/pixel, rms) | 742 | 308 |

Radiometry Analysis for OP-GPS System

Preliminary sky radiometry calculations indicated that at high altitudes (above 5 km=16,000 ft) there may be an advantage to removing the usual 1350 nm long pass filter used to reduce sky background which permits collecting light over the full 0.9 um to 1.7 um InGaAs response curve. This will increase the signal level for stars hotter than 1200 K and is expected to improve signal levels from solar illuminated satellites which are expected to have spectral behavior similar to the sun (approximately a 5900 K blackbody).

In addition, during night operations there is not any reason to have a long pass filter. The original plan switches to a visible camera during the night, however, recent improvements in InGaAs cameras (Sensors Unlimited 1280JSX, 1024×1024 pixels, 35 e rms read noise) may make the visible camera unnecessary greatly simplifying the optical design.

The analysis consists of simply calculating the radiometric SNR, $$SNR = \frac{N_s}{\sqrt{N_s + N_p(N_b + \sigma_r^2)}}$$

where $N_s$ is the number of signal photons from the target detected per frame, $N_b$ is the number of sky background photons detected per pixel per frame, $N_p$ is the number of object size in pixels (assumed to be 4, i.e. unresolved, for both stars and satellites), $\sigma_r$ is the noise per detector in photoelectrons.

The number of photons detected from the object is calculated based on the assumed object blackbody temperature, sensor QE, and appropriate atmospheric transmission[1] calculated from MODTRAN. The sky background is calculated with the same wavelength integration using the appropriate sky scatter calculated using MODTRAN. Based on the SNR calculations, the limiting magnitude is calculated for the different designs and compared. The top level design parameters for InGaAs camera are listed in Table 1. Table 2 summarizes the top level design parameters for visible band CMOS camera.

The limiting magnitude for the three different apertures is compared in Table 3 for InGaAs camera with and without the 1350 nm long pass filter. All of the results have been resealed slightly based on the assumption that the camera is limited to 500,000 photo-electrons per pixel by reducing the exposure time for all cases with excessive light levels. Similar calculations are repeated in Table 4 for a different solar, observer geometry. Tables 3 and 4 show star limiting magnitude vs altitude above sea level (AMSL) for three aperture diameters: 4 cm, 6 cm and 8 cm, as well as limiting magnitude at night at sea level.

In both cases there is a slight (less than 0.5 visual magnitude) advantage to running without the filter at sea level. This advantage will turn to a disadvantage closer for look angles closer to the sun. At higher altitudes, 16,000 ft and up, running without the filter provides a 0.5 to 0.9 magnitude improvement. At night the improvement is as large as 1.7 magnitudes for the larger apertures. Finally the $4^{th}$ magnitude limit for the sea level for the 6 cm apertures is sufficient to detect a sufficient number of low earth orbit objects for the system to provide a good update rate.

The night performance of the InGaAs system (last row Table 3 or 4) can be compared with the performance of a visible camera based system in Table 5. The results show that despite the improved read noise on the InGaAs sensor that the visible based system still has a 1 magnitude advantage for objects with the same spectrum as the sun. Due to the large number of bright red and infrared analysis, additional analysis will be required to determine whether the visible system has an overall performance advantage.

In conclusion the analysis has shown the following. To zero order a 30 frame per second InGaAs camera detects to $4^{th}$ magnitude visible at a 6 cm aperture at sea level during the day (assuming it is far enough from the sun). The wide range of sky backgrounds imply that system should incorporate a motorized filter (1350 nm long pass, clear) and AGC/AEC all three of which will be set based on measured sky background levels. Finally additional work to optimize the pixel size since previous experience is that often a larger angular pixel size (and thus field of view) provides a higher probability of detection of stars in spite of a brighter limiting magnitude, along with similar analysis to determine whether a visible or InGaAs system provides the best performance at night.

TABLE 1

Top level design parameters (InGaAs camera based).
(3 aperture sizes compared)

| InGaAs system (SU 1280JSX) Parameter | Units | Aper 1 value | Aper 2 | Aper 3 |
|---|---|---|---|---|
| Aper diameter | cm | 4 | 6 | 8 |
| exposure time | ms | 30 | 30 | 30 |
| camera read noise | pe rms/pixel | 35 | 35 | 35 |
| optics transmission |  | 0.8 | 0.8 | 0.8 |
| pixel size | ur | 30 | 20 | 15 |
| diff limit spot size | ur | 30 | 20 | 15 |
| FOV | deg | 1.8 | 1.2 | 0.9 |

TABLE 2

Top level design parameters (visible, CMOS camera based)
(3 aperture sizes compared) (night use only)

| Visible system (5 Mpix CMOS) Parameter | Units | Aper 1 value | Aper 2 | Aper 3 |
|---|---|---|---|---|
| Aper diameter | cm | 4 | 6 | 8 |
| exposure time | ms | 30 | 30 | 30 |
| camera read noise | pe rms/pixel | 10 | 10 | 10 |
| optics transmission |  | 0.8 | 0.8 | 0.8 |
| pixel size | ur | 17.5 | 11.7 | 8.75 |
| diff limit spot size | ur | 17.5 | 11.7 | 8.75 |
| FOV | deg | 2.4 | 1.6 | 1.2 |

TABLE 3

Calculated limiting magnitude (visual magnitude, solar spectrum source)
(InGaAs system, zenith looking, sun zenith of 40 degree)

| altitude (ft, AMSL) | Aperture (cm) 4 no filter | 1350 nm long pass | 6 no filter | 1350 nm long pass | 8 no filter | 1350 nm long pass |
|---|---|---|---|---|---|---|
| 0 | 3.2 | 2.9 | 4.1 | 3.8 | 4.7 | 4.4 |
| 16,000 | 5.3 | 4.9 | 6.2 | 5.7 | 6.9 | 6.4 |
| 32,000 | 6.1 | 5.6 | 7 | 6.5 | 7.6 | 7.1 |
| 48,000 | 6.4 | 5.8 | 7.2 | 6.7 | 7.9 | 7.3 |
| 60,000 | 6.7 | 6 | 7.6 | 6.9 | 8.2 | 7.5 |
| night, sea level | 6.9 | 5.2 | 7.8 | 6.1 | 8.5 | 6.8 |

TABLE 4

Calculated limiting magnitude (visual magnitude, solar spectrum source)
(InGaAs system, looking 30 deg off zenith, sun zenith of 40 degree, azimuth of 135 deg of observer)

| altitude (ft, AMSL) | Aperture (cm) 4 no filter | 1350 nm long pass | 6 no filter | 1350 nm long pass | 8 no filter | 1350 nm long pass |
|---|---|---|---|---|---|---|
| 0 | 4.3 | 3.7 | 5.2 | 4.5 | 5.8 | 5.2 |
| 16,000 | 6 | 5.4 | 6.9 | 6.3 | 7.5 | 6.9 |
| 32,000 | 6.6 | 6 | 7.5 | 6.8 | 8.1 | 7.5 |
| 48,000 | 6.9 | 6.1 | 7.7 | 7 | 8.4 | 7.6 |
| 60,000 | 7.1 | 6.2 | 8 | 7.1 | 8.6 | 7.7 |
| night, sea level | 6.9 | 5.2 | 7.8 | 6.1 | 8.4 | 6.7 |

TABLE 5

Comparison of visible and InGaAs systems at sea level during night (no sky background) operations.

| Aper (cm) | mag limit vis system | InGaAs (w/o filter) |
|---|---|---|
| 4 | 7.8 | 6.9 |
| 6 | 8.7 | 7.8 |
| 8 | 9.3 | 8.5 |

Kalman Filter

Applicant's special navigation type Kalman filter combines star and satellite information with IMU measurements. Since both star measurements (for attitude fix determination) and satellite measurements (for position fix and velocity determination) are performed sequentially and are separated in time, a special Kalman filter is required to combine these measurements with the output from the IMU on the moving vehicle. In the Kalman filter, all error states are modeled as zero mean noise processes with known variances, power spectra densities, and time correlation parameters. Thus, the various error quantities and associated measurement noises are all random processes whose correlation structure is assumed to be known. The Kalman filter then obtains estimates of the states of these stochastic processes, which are described by a linearized mathematical model. Applicants assumed that the correlation structure of the various processes involved and the measurements of linear combination of the error states are known. Both the measurement processes and error propagation in time are expressed in vector form. This provides a convenient way with linear matrix algebra to keep track of relatively complex relationships among all the quantities of interest. Under the assumption of Gaussian noise distribution, the Kalman filter minimizes the mean square error in its estimates of the modeled state variables.

Figure 4:
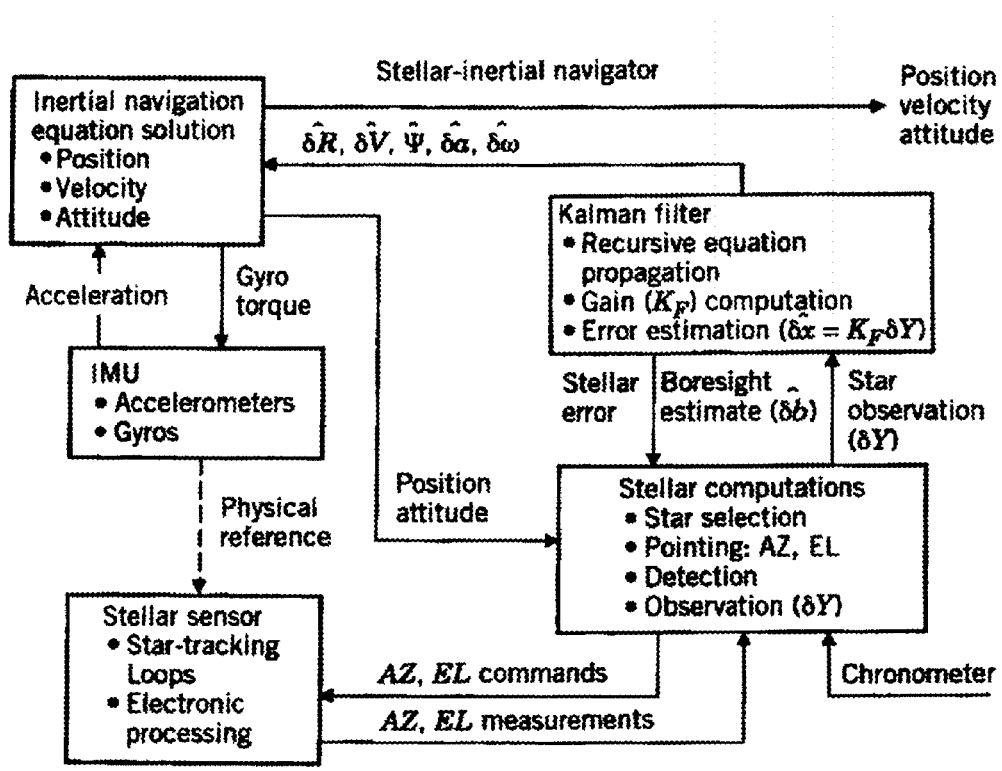
FIG. 4 is a simplified block diagram of conventional Kalman-integrated stabilized stellar-inertial navigator.

FIG. 4 depicts a simplified block diagram of the special Kalman-integrated stellar-inertial filter. This filter provides position, velocity and attitude information by combining IMU measurements with inputs from a stellar sensor. In these embodiments, the stellar sensor provides the attitude (azimuth and elevation) measurements. Contrary to the conventional stellar sensor, the star and satellite tracker in embodiments of the present invention provides both attitude and position fixes independent of GPS. To integrate these attitude and position fixes from the star and satellite tracker with the IMU measurements to bound position and attitude errors, an advanced navigation-type Kalman filter is required. Applicants' preferred embodiments includes the unscented Kalman filter.

Preferred 21-Inch Prototype Design

Figure 5:
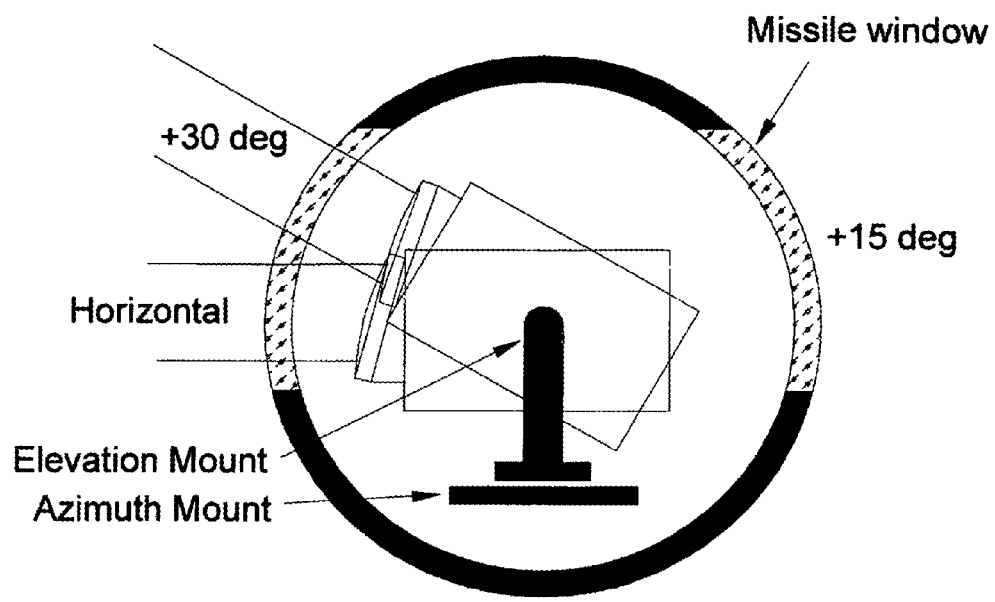
FIG. 5 shows a preferred telescopes and mounting structure, looking down the missile axis, in three alternate positions.

Applicants have developed a preferred 21-inch design for incorporation into a small aircraft. Incorporating a small gimbaled telescope into a 21-inch diameter cylindrical housing is a challenge. Applicants assume that the telescope will be somewhere in the center of the missile, surrounded by a cut-away cylindrical window conformal to the outside diameter. This is shown in FIG. 5. The two basic problems are how to design a telescope that can handle the severe wavefront distortions caused by the window, and how to design a gimbal that leaves room for the largest possible telescope aperture.

Figure 6:
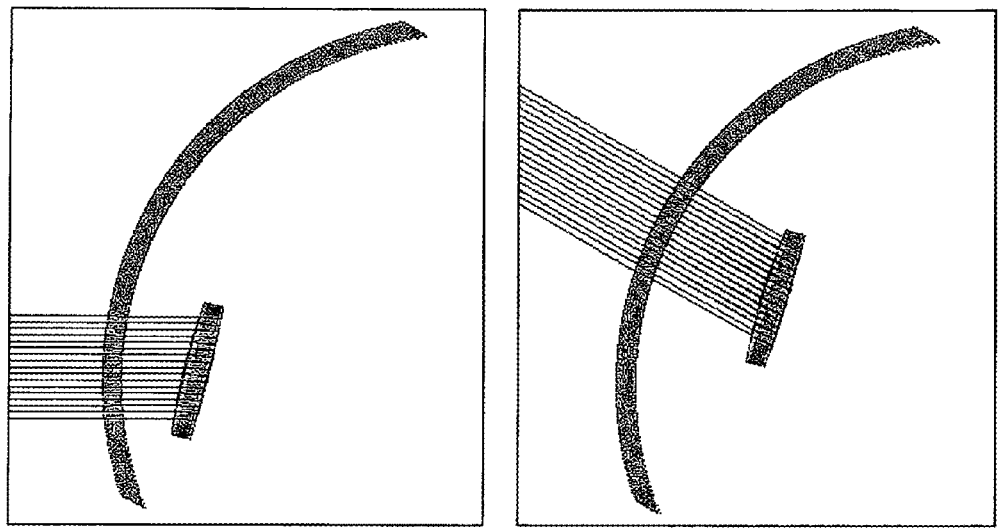
FIG. 6 demonstrates that tilting the objective lens of a refracting telescope cancels most of the optical aberrations caused by a cylindrical window.
Figure 7:
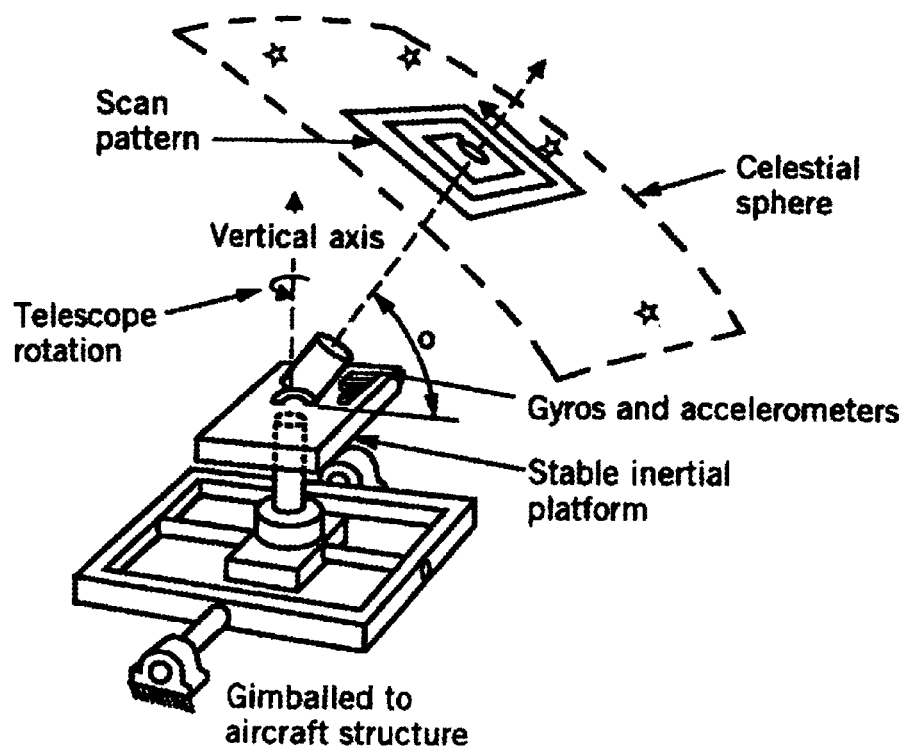
FIG. 7 is a schematic diagram of a preferred embodiment of the present invention.

FIG. 5 shows the placement of a 125 mm aperture telescope in the small aircraft. The telescope is approximately 250 mm long, supported by an altitude azimuth gimbal. The telescope is shown in three alternate positions. The telescope can view down to the horizon and up to at least a 45° altitude, where most satellite observations will occur. Note that the optical pupil, a refractor lens in this example, is tilted with respect to the telescope tube, depending on the elevation angle. The refractor lens will be tilted using mechanical actuators. The amount of tilt of the optical pupil will be pre-calculated. To a first order, this cancels the optical aberrations caused by the concentric cylindrical window surfaces. Since a diffraction-limited image is not required to image satellites or bright stars, this solution may the most practical. To improve the image further and allow imaging dimmer stars or satellites, some active optical control such as a membrane deformable mirror may be provided. FIG. 6 shows the lens orientation for two cases.

When the telescope scans forward or aft of the centerline, the resulting optical performance is not that different from looking out radially from the missile. If the refractor lens in this example is tilted vertically as shown in FIG. 5, then most of the corrective work is already done. Improving the optical image by adjusting the tilt allows dimmer stars or satellites to be imaged. FIG. 5 also shows how the gimbal fits into a small aircraft. Since observations at angles greater than approximately 45° in either azimuth or elevation are not required, the gimbal is simplified. Only one axis needs to be able to rotate more than 180°.

The smallest telescope that might be used to image bright stars with sufficient resolution has an approximately 30 mm aperture. Thus, the requirement that drives the optics design is the need to image dimmer satellites with short exposures. Applicants have determined that an aperture between 100 mm and 150 mm is preferred. Preferred embodiments use a reflecting primary and a thick front corrector to form a compact design with a relatively long focal length. The design is easily made more rugged by replacing the aluminum tube structure with more stable carbon composites or titanium rods. The length of the telescope must be kept under approximately 250 mm, to fit in its tiny compartment in this preferred embodiment, but this is easily accomplished by adding small internal fold mirrors near the focal plane.

Preferred gimbles are available form suppliers such as Aerotech and Atlantic Positioning. Cameras may be off the shelf cameras, either visible or short wave infrared cameras.

LEO Satellite Imaging Tests

To image LEO satellites, the camera needs a high frame rate so that stars can be detected while moving across the field in more than one frame. For this reason, Applicants chose a monochrome CCD camera available from Point Grey Research Chameleon, Inc with offices in Richmond BC, Canada. Applicants purchased a Stellarvue refractor telescope with a 50 mm aperture and a focal length of 330 mm, which is close to the optimum design. With the Chameleon camera, this telescope provides a 0.83°×0.63° field of view. This FOV is wide enough to image several stars along the satellite track as the satellite passes overhead. The plate scale is about 2.3 arcsec per pixel, so Applicants could measure bright stars positions to sub-arcsecond resolution. The Stellervue telescope is mounted onto a Paramount tracking mount available from Stellervue with offices in Auburn, Calif.

Preferred embodiments require pointing to a satellite and recording images of the satellite and nearby reference stars with millisecond timing accuracy. For these test to allow this precise timing, the camera was triggered externally with a signal generated by a GPS antenna. The GPS unit output five pulses per second with microsecond precision. Referred embodiments should be able to operate without GPS with alternate timing sources.

Figure 11:
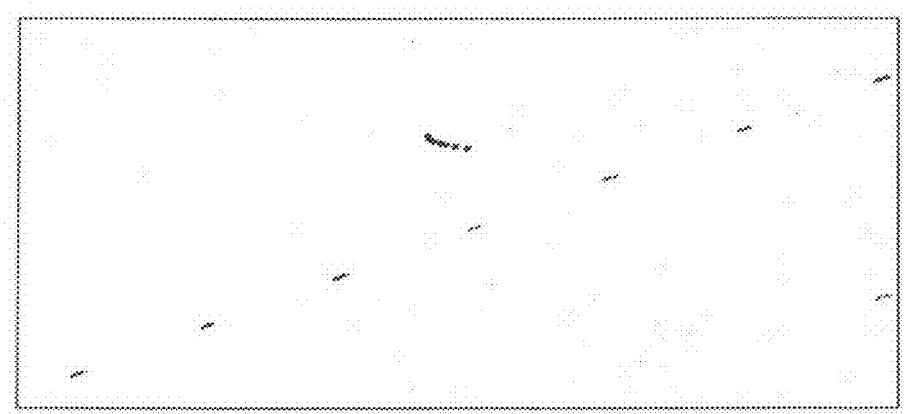
FIG. 11 is an image of tracked LEO satellite along with a corresponding images of a bright reference star.

Using this camera, telescope, and a different azimuth-elevation mount has allowed Applicants to take preliminary data at the temporary testing location in San Diego. Shown in FIG. 11 is a LEO satellite and bright reference star in the same FOV. The figure is actually a cropped portion of seven frames (every tenth frame used of 70) superimposed to show the tracks. The telescope tracking error is not perfect, so the satellite shows as a small series of dots. A bright star is shown as the satellite passes nearby. The intensity variation during each 20 msec exposure is due to atmospheric scintillation as well as pixel alignment. In preferred embodiments custom software will be used to record the centroid of each small streak for detailed angular position analysis. Based on those calculations, the geo-position of the observer can be derived. Recording several satellites and multiple stars will reduce the final uncertainties.

Analysis of the angles-only technique was done to determine the mount pointing requirements and to compare results of tracking stars to tracking satellites. The original technique was focused on tracking LEO satellites. Applicants actually prefer to track the stars, in order to see very dim reference stars, resulting in a very accurate pointing direction. As the satellite passes by, the short streaks can be measured to get the absolute angle in the sky. This works for many LEO satellites, since they are often much brighter than the reference stars.

To support this data acquisition technique, Applicants set up the camera and telescope and took some preliminary data on May 13, 2013. Applicants were able to point the telescope at a known reference star, and allow the satellite to pass through the frame. Once the satellite had passed, the telescope could be re-pointed at another reference star further along the satellite's path. This was repeated for several minutes, giving dozens of reference stars with the satellite moving across the full sky.

As an example, FIG. 11 shows the path of LEO satellite #17295 as it moved across the sky in about 6 minutes. The satellite started in the South, shown at the bottom of the all-sky projection, then went nearly overhead, and continued toward the North and out of sight.

Figure 12:
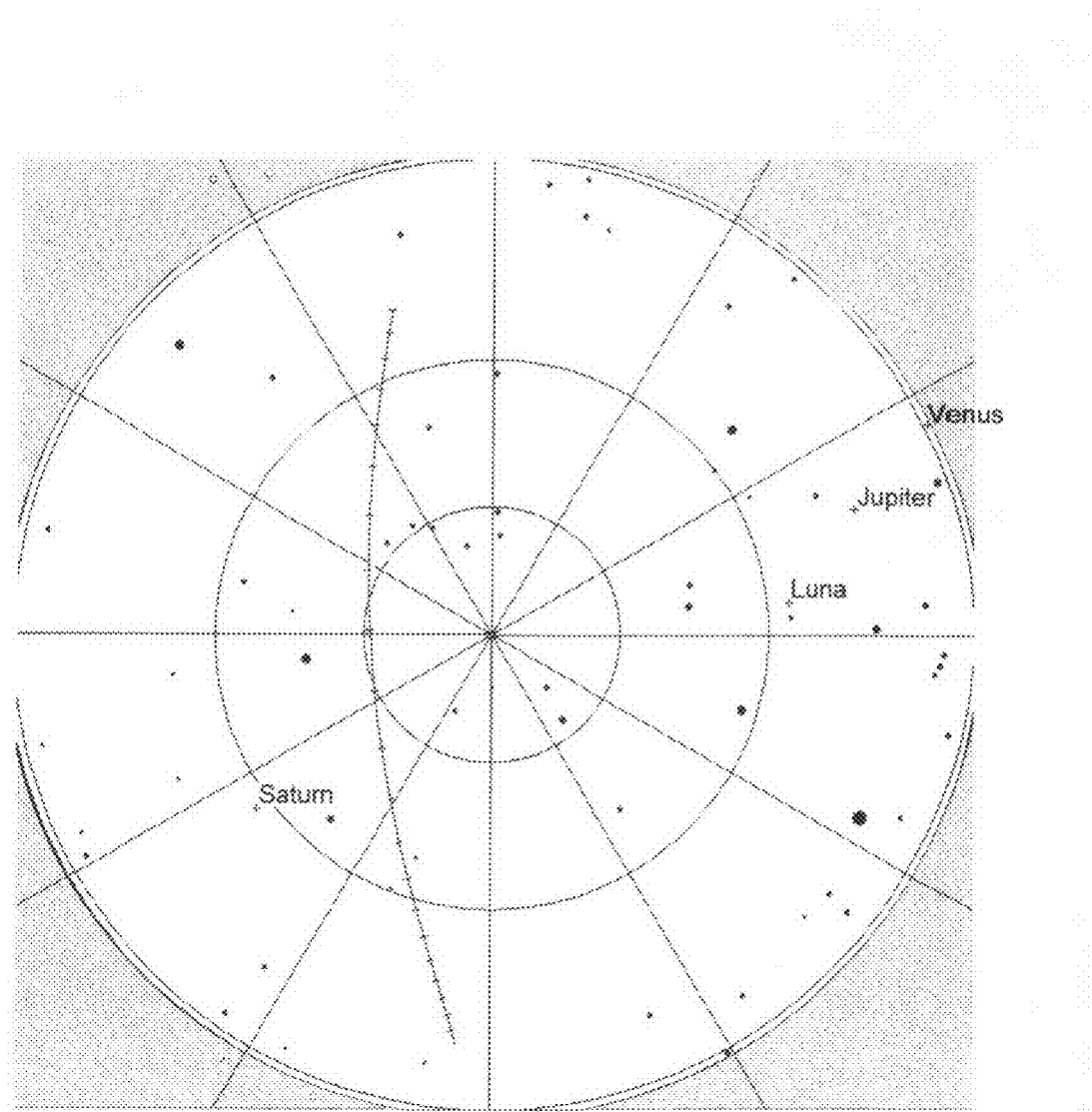
FIG. 12 shows a six minute path of a LEO satellite.
Figure 13:
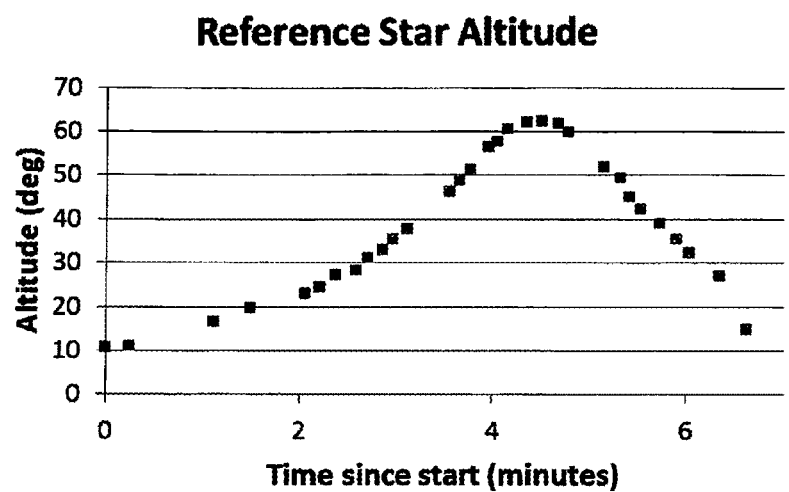
FIG. 13 shows altitudes of several reference stars along the path of the FIG. 10 satellite.

As the satellite moved across the sky, consecutive reference bright stars were tracked until the satellite passed by, then the telescope moved to the next star. The altitude of these reference stars is plotted in FIG. 12. Each point represents a star. A total of 29 reference stars were imaged along the path of LEO satellite #17295. This gives nearly continuous coverage of the LEO satellite over much of its visible path, all with very high angular resolution.

Imaging GPS Satellites

Initial tests to image GPS satellites showed that they provided a much better target at night, so for this effort, testing was performed at night. A Televue NP127 telescope with a 127 mm aperture, was large enough to images GPS satellites while tracking them. The nearby reference stars in the same frame appear as short streaks, since the GPS satellites move relatively slowly. Exposures nominally 5 seconds long were needed to get usable images of the GPS satellites.

For LEO satellites, it is necessary to calculate the satellites orbits from the data, based on an original estimate provided by Two-Line Element sets (TLEs), the data format used to describe the ephemeris of Earth orbiting satellites. For GPS satellites, however, the orbit is already precisely known. The primary errors in the geo-location calculations come from processing the satellite and star images. Since GPS satellites are much further away (20,000 km) as compared with LEO satellites (500 km-1,000 km), their angles must be determined more precisely. Unfortunately, the GPS satellites are dimmer than the LEO satellites, so precise angular measurements are more difficult. In case of GPS satellites, Applicants changed the observation procedure. They tracked the GPS satellite, whereas the star images appeared as the shot streaks. Because the GPS satellite motion across the sky is very slow, tracking these satellites is straightforward. For the same reason, bright and dim stars are also visible, because their streaks are relatively short.

An example image from this set-up is shown FIG. 11. The short streaks are stars, and the negative image is shown for better visibility. The GPS satellite is only one pixel in diameter, and is not visible on this reduced image. Note that many bright reference stars are visible in the frame. This reduces the uncertainties in the GPS position.

Based on a preliminary analysis using only a few of the reference stars, the RMS geo-location error for three GPS satellite series was calculated to be 18 m. This is remarkably good, and might be improved to 10 m with additional processing and with additional GPS satellites.

Figure 14:
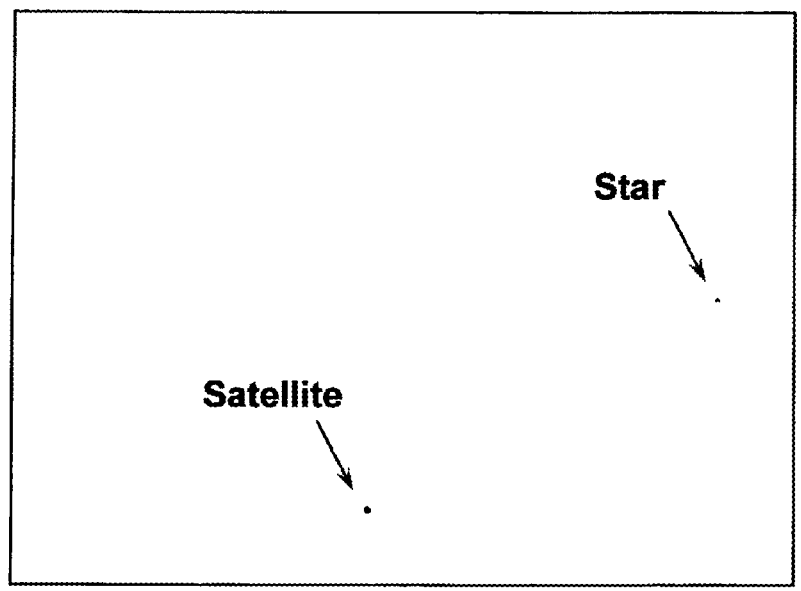
FIG. 14 shows daytime images of LEO satellites and bright stars.

The final example FIG. 14 shows daytime imaging of LEO satellites using an 8" reflecting telescope and InGaAs camera. (In this figure, grey from the image is reproduced as white and white is reproduced as black.) The technique used here to increase contrast was to subtract the next frame to cancel the daytime background. This makes the sky background nearly zero, with the noise level stretched to give a flat, gray background. Since the satellite moved between frames, it was not subtracted and is easily visible. The star is not easily seen in this reproduction, since it was being tracked, and the frame subtraction also hides the star. The location is marked on the image, based on a previous subtraction of a different, shifted frame. Only one reference star is visible in each frame, but as the satellite is tracked across the sky, other reference stars appear. This allows good measurements, leading to good geo-location accuracy.

Proof of Principal Tests

Data collection for proof of principal was performed on May 20, 2013. This data included imaging reference fields to calibrate camera plate scale and distortion, as well as two GPS satellites. The data collection was initiated with tracking stars near the GPS satellite location, and then switched to tracking the GPS satellite itself. The data collected while tracking stars was used to determine the plate scale in the camera.

Figure 15:
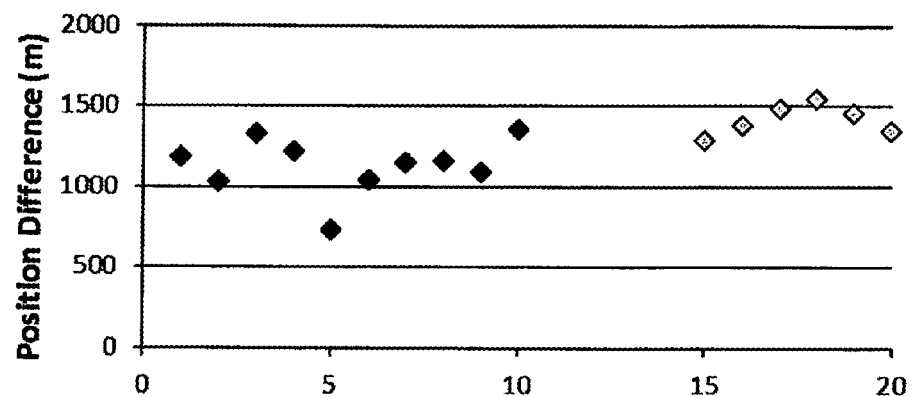
FIGS. 15 and 16 show frames of GPS satellite position differences.

The satellite observations were analyzed to determine the measurement error. While tracking the satellite, the stars appear as short streaks. Typically, eight to ten stars were measured to reduce the uncertainties in the measured satellite position. For these stars, the expected angular distance to the GPS satellite (based on its most recently published two-line element set) was determined by a least-square fit. The measured location of the two satellite series was then compared to the expected position for 10 and for 6 frames, shown in FIG. 15. The points on the left are for the first satellite, while the points on the right are for the second satellite. The position difference of about 600 meters is the total distance difference between where the satellite was actually observed, compared to where the two-line element predicted where it should be.

The 1300 m difference is due to the changing orbit of the GPS satellite, not reflected in the TLEs. More precise orbital locations are available at the jpl.nasa.gov web site, for example, but that data was not needed in this error analysis. What is important is the scatter (for each satellite) in the location. For the first satellite, the RMS scatter is 180 m, while the RMS is 100 m for the second satellite. Dividing the RMS error by the square root of the number of independent measurements yields the geo-location error of 60 m for the first satellite and 44 m for the second satellite. The average geo-location error is 52 m.

The precision of about 50 m from this short initial data set can be improved in several ways. The key is to reduce the measurement error of the streaked star images, including using a custom image processing program to accurately calculate the centroids of tilted streaks. This would reduce the noise, giving another factor of two improvement. Finally, taking additional satellite images and star images under good weather conditions, as well as including additional satellites, would reduce the plate scale errors and improve the statistics. This would also give a factor of two or better improvement. Combined, these should reduce the geo-location uncertainty to less than 10 m. This is comparable to the current radio GPS location uncertainty. The time to record this extra data is less than an hour. In practice, a geo-location as accurate as the current GPS system can be realized every hour in a working system.

Additional Tests

A set of GPS satellite images were recorded on Aug. 4, 2013. The sky was clearer, so the GPS satellites were easily visible. A series of 30 frames were recorded at four different times. The telescope optics were improved for these tests. These improvements resulted in a geo-position error of less than 20 meters. The preliminary analysis reported here was done manually, so only eight to fifteen stars were measured. Using more of these stars might provide the statistics to reduce the geo-position uncertainty to 10 meters.

Figure 16:
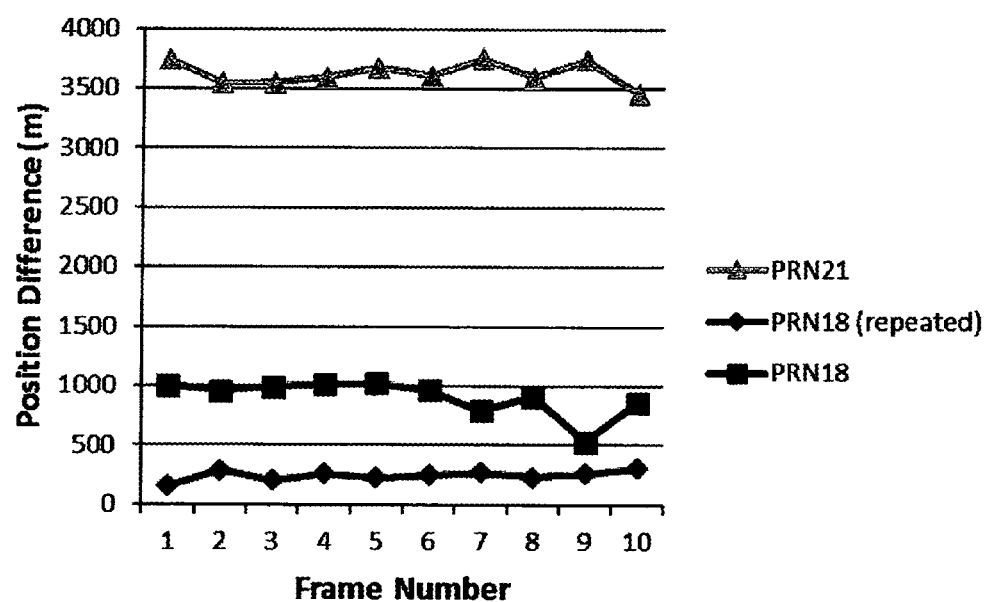

The results of the analysis are shown in FIG. 16. The reader should note that satellite #18 was measured twice in about a 30 minute period. Near the last of the 10 processed frames, the satellite appears to be moving. This makes the line noisier. The second set of measurements show the satellite moved about 700 meters, likely due to orbital maintenance. These corrections are not shown in the TLEs, but would be visible in the more precise orbital records.

Based on the scatter in these results, the geo-location errors for the three series are calculated as 44 m, 151 m, and 99 m. The mean error is 98 m. Since these are statistical means that have a Gaussian distribution, dividing the RMS error by the square root of the number of independent measurements yields the geo-location error of 18 m. This is remarkably good, and might be improved to 10 m with additional processing.

Potential Improvements

As discussed, it was necessary to process the data by hand. This meant that only a fraction of the stars in the data frames were analyzed. With additional development, it would be possible to implement an automated program that would allow for the analysis of hundreds of stars per frame. Depending on how many stars can be extracted from each image, the uncertainty can be decreased by roughly a factor of two.

Another future improvement will be to use an electronic or mechanical shutter in the camera to better determine the location of the stars. The current technique is to take a single long exposure, resulting in a long streak. The location of the streak then depends on its uniformity, and the center portion of the streak contains no information. By using a 1 Hz shutter, for example, to block the telescope or camera for perhaps 0.3 seconds, the long streak will be imaged as a series of short streaks, which can be processed with much higher precision. The GPS satellite will be unaffected, except for a slight reduction in signal. This technique may be required to reduce the geo-position to the 5 m level. This is probably the limit for this type of system.

VARIATIONS

The present invention is very useful for military aircraft which could be operated in regions where GPS is not available or otherwise compromised. Where unit size is not critical, larger telescopes could be utilized to improve performance. Persons skilled in this art will recognize that many other variations are possible within the scope of the present invention; therefore the scope of the present invention should be determined by the appended claims and their legal equivalents rather than by the examples given.

What is claimed is:

1. An angles only navigation system for determining position, orientation and velocity of an aircraft, said system comprising:
   A) a stabilized mount;
   B) an optical star and satellite tracker comprising a telescope and an infrared camera and adapted to track earth orbiting satellites or stars and to record satellite images along with at least one reference star;
   C) an IMU co-located with the star and satellite tracker;
   D) a computer processor adapted to compute satellite tracker data including at least two line of sight angles from the aircraft to at least one satellite with known three dimensional coordinates; and
   E) a Kalman filter adapted to optimally blend the star and satellite tracker data and the IMU measurements together to provide navigation information.

2. The system as in claim 1 wherein the line of sight angles are azimuth and elevation angles.

3. The navigation system as in claim 1 wherein the stabalized mount is a gimbled platform.

4. The navigation system as in claim 1 wherein the tracker is adapted to operate in a short wave infrared spectral range.

5. The navigation system as in claim 1 wherein the at least one satellite is a plurality of satellites.

6. The navigation system as in claim 3 wherein the short-wave infrared spectral range is a wavelength range between 1.4 micron and 1.7 micron.

7. The navigation system as in claim 1 wherein the tracker is adapted to operate in a visible spectral range.

8. The navigation system as in claim 1 wherein the angles only navigation is adapted to fit within a high-speed, high-altitude aircraft.

9. The navigation system as in claim 6 wherein the high-speed, high-altitude aircraft is an un-manned arial vehicle.

10. The navigation system as in claim 7 wherein the high-speed, high-altitude aircraft is a guided missile.

11. The navigation system as in claim 1 wherein the system is installed on board a land-based vehicle.

12. The navigation system as in claim 1 wherein the system is installed on board a water-based vehicle.

13. The system as in claim 12 wherein the water-based vehicle is a ship.

14. The navigation system as in claim 1 wherein the star and satellite tracker is adapted to track an earth orbiting satellite while imaging at least one star.

15. The navigation system as in claim 1 wherein the star and satellite tracker is adapted to track at least one star earth orbiting satellites while imaging at least one earth orbiting satellite.

16. The navigation system as in claim 1 wherein the computer processor is programmed to treat stars as providing an infinite paralax and earth orbiting satellites as providing a finite paralax.

* * * * *